US010150137B2

(12) United States Patent
Bondeson et al.

(10) Patent No.: US 10,150,137 B2
(45) **Date of Patent: *Dec. 11, 2018**

(54) ADHESIVE DISPENSING SYSTEM AND METHOD USING SMART MELT HEATER CONTROL

(71) Applicant: NORDSON CORPORATION, Westlake, OH (US)

(72) Inventors: Benjamin J. Bondeson, Suwanee, GA (US); Peter W. Estelle, Norcross, GA (US); Kent Hand, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,972

(22) Filed: Oct. 24, 2016

(65) Prior Publication Data

US 2017/0036236 A1 Feb. 9, 2017

Related U.S. Application Data

(60) Continuation of application No. 14/920,832, filed on Oct. 22, 2015, now Pat. No. 9,475,083, which is a division of application No. 13/799,737, filed on Mar. 13, 2013, now Pat. No. 9,200,741.

(60) Provisional application No. 61/718,311, filed on Oct. 25, 2012.

(51) Int. Cl.
*B05C 11/10* (2006.01)
*F16L 53/00* (2018.01)

(52) U.S. Cl.
CPC ...... *B05C 11/1042* (2013.01); *B05C 11/1002* (2013.01); *B05C 11/1007* (2013.01);
(Continued)

(58) Field of Classification Search
CPC ............. B05C 11/1042; B05C 11/1002; B05C 11/1007; B05C 5/001; B05C 9/14;
(Continued)

(56) References Cited

U.S. PATENT DOCUMENTS 2,672,215 A 3/1954 Schmid Otto
2,744,792 A 5/1956 Finn et al.
(Continued)

FOREIGN PATENT DOCUMENTS

CN 202116049 U 1/2012
DE 3815089 A1 3/1990
(Continued)

OTHER PUBLICATIONS

MELTEX GmbH; Product Information Sheet; Hot Melt Applicator MX 2003; 2 pages.
(Continued)

*Primary Examiner* — Benjamin R Shaw
(74) *Attorney, Agent, or Firm* — Baker & Hostetler LLP

(57) ABSTRACT

An adhesive dispensing system is disclosed. The system includes a heater unit configured to heat an adhesive to an application temperature, a fill system configured to supply the adhesive to said heater unit, and a controller. The controller is configured to actuate the fill system to supply the adhesive to the heater unit, operate the heater unit to maintain a unit set point temperature sufficient to heat the adhesive to the application temperature, and operate the heater unit to reduce its temperature from the unit set point temperature following a first set threshold time from actuation of the fill system to supply the adhesive to the heater unit.

23 Claims, 7 Drawing Sheets

(52) U.S. Cl.
CPC ......... *F16L 53/00* (2013.01); *Y10T 137/0391* (2015.04); *Y10T 137/6416* (2015.04)

(58) Field of Classification Search
CPC ................ F16L 53/00; Y10T 137/0391; Y10T 137/6416; G05B 2219/2601; G05B 219/45235; G67D 99/00
USPC ............................................................ 222/64
See application file for complete search history.

(56) References Cited

U.S. PATENT DOCUMENTS 2,824,335 A 2/1958 Moffat et al.
2,868,015 A 1/1959 Haropulos et al.
3,030,153 A 4/1962 Krenke et al.
3,219,394 A 11/1965 Moss et al.
3,377,861 A 4/1968 Sherwood et al.
3,580,644 A 5/1971 Ballard et al.
3,756,456 A 9/1973 Georgi
3,773,069 A * 11/1973 Rebentisch ......... B05C 11/1042 137/341
3,981,416 A 9/1976 Scholl
4,084,628 A 4/1978 Schmid
4,086,466 A * 4/1978 Scharlack .......... G05D 23/2401 219/494
4,277,773 A 7/1981 Blatnik
4,417,675 A * 11/1983 Abt ......................... B05C 5/001 219/421
4,437,581 A * 3/1984 Coker ..................... B05B 7/166 222/54
4,441,450 A 4/1984 Dettelbach et al.
4,474,311 A 10/1984 Petrecca
4,479,600 A 10/1984 Albright
4,482,367 A 11/1984 Howeth
4,583,885 A 4/1986 Thiele
4,688,432 A 8/1987 Marsh
4,821,922 A * 4/1989 Miller ................... B29B 13/022 177/184
4,850,425 A 7/1989 Anderson
4,888,432 A 12/1989 Hamprecht
4,898,527 A * 2/1990 Claassen ............... B29B 13/022 222/53
4,994,984 A 2/1991 Massimo
5,006,018 A 4/1991 Depew
5,174,472 A 12/1992 Raque et al.
5,287,086 A 2/1994 Gibb
5,294,218 A 3/1994 Fiorentini et al.
5,332,366 A 7/1994 Anderson
5,341,867 A 8/1994 Yamada et al.
5,347,867 A 9/1994 Pangerl
5,589,203 A 12/1996 Sato
5,680,961 A * 10/1997 Boccagno ........... B05C 11/1042 219/421
5,715,972 A 2/1998 Siddiqui
5,747,689 A 5/1998 Hampo et al.
5,791,830 A 8/1998 Fort et al.
5,909,829 A 6/1999 Wegman et al.
6,039,513 A 3/2000 Law
6,073,488 A 6/2000 Byatt et al.
6,095,803 A 8/2000 Slater
6,175,101 B1 1/2001 Miller et al.
6,230,936 B1 5/2001 Lasko
6,352,173 B1 * 3/2002 Duckworth ......... B05C 11/1042 221/120
6,471,751 B1 10/2002 Semanderes et al.
6,616,721 B2 9/2003 Oh
6,883,684 B2 4/2005 Jeter et al.
7,137,532 B2 11/2006 Jeter
7,263,781 B2 9/2007 Sielemann
7,626,143 B2 * 12/2009 Miller ..................... B05C 5/001 219/421
8,157,483 B2 4/2012 Volkmann
8,201,717 B2 6/2012 Varga et al.
8,383,991 B2 2/2013 Ganzer et al.
8,430,230 B1 4/2013 Ferguson et al.
8,580,006 B2 11/2013 LaCroix et al.
9,169,088 B2 10/2015 Chau et al.
9,200,741 B2 12/2015 Bondeson et al.
2002/0079325 A1 6/2002 Estelle
2003/0021700 A1 1/2003 Serafin et al.
2003/0080154 A1 * 5/2003 Jeter ....................... B05C 11/10 222/146.5
2003/0080156 A1 * 5/2003 Jeter ................... B05C 11/1042 222/146.5
2004/0167738 A1 8/2004 Miller
2005/0095359 A1 5/2005 Pallante et al.
2005/0214740 A1 9/2005 Ushio et al.
2005/0274740 A1 12/2005 Duckworth et al.
2006/0055503 A1 3/2006 Tanida
2006/0159565 A1 7/2006 Sanwald
2007/0080157 A1 4/2007 Mehaffy et al.
2007/0216424 A1 9/2007 Sieh et al.
2008/0041233 A1 * 2/2008 Bunn .................... A47J 31/007 99/281
2008/0095637 A1 4/2008 Burdi et al.
2008/0120046 A1 5/2008 Tung et al.
2008/0145248 A1 6/2008 Kato et al.
2008/0156801 A1 7/2008 Tung et al.
2008/0196512 A1 8/2008 Miller
2008/0199323 A1 8/2008 Bauck et al.
2008/0206066 A1 8/2008 Nguyen et al.
2008/0282795 A1 11/2008 Zabel et al.
2008/0302477 A1 12/2008 Varga et al.
2009/0229359 A1 9/2009 Reimelt et al.
2009/0229683 A1 9/2009 Baek et al.
2009/0285983 A1 11/2009 Baldauf et al.
2010/0282088 A1 * 11/2010 Deuber ................... A47J 31/52 99/281
2011/0000309 A1 1/2011 Griffiths et al.
2011/0002793 A1 1/2011 Bauck et al.
2011/0042408 A1 * 2/2011 Giordano ................ A47J 31/44 222/23
2011/0079078 A1 4/2011 Ho et al.
2011/0100120 A1 5/2011 Neuburger et al.
2012/0051945 A1 3/2012 Orndorff et al.
2012/0227484 A1 9/2012 Chen et al.
2012/0247665 A1 10/2012 Varga et al.
2012/0273071 A1 11/2012 Kai
2013/0105003 A1 5/2013 Quam et al.
2013/0105004 A1 5/2013 Tix et al.
2013/0105005 A1 5/2013 Tix et al.
2013/0105039 A1 5/2013 Tix et al.
2013/0105517 A1 5/2013 Tix et al.
2013/0105526 A1 5/2013 Ross et al.
2013/0112279 A1 * 5/2013 Ross ................... B05C 11/1042 137/13
2013/0112280 A1 5/2013 Quam et al.
2013/0112294 A1 5/2013 Ross et al.
2013/0112312 A1 5/2013 Ross et al.
2013/0112709 A1 5/2013 Ross et al.
2013/0112710 A1 5/2013 Ross et al.
2013/0112711 A1 5/2013 Lind et al.
2013/0115016 A1 5/2013 Ross et al.
2013/0205893 A1 8/2013 Shearer et al.
2014/0020463 A1 1/2014 Ikeya et al.
2014/0116525 A1 * 5/2014 Bondeson ........... B05C 11/1002 137/13

FOREIGN PATENT DOCUMENTS

DE 19923410 A1 11/1999
DE 10156691 A1 5/2003
EP 0072679 A1 2/1983
EP 1350743 B1 6/2006
EP 2119509 A2 11/2009
FR 1366936 A 7/1964
FR 2787770 A1 6/2000
GB 1562562 A 5/1980
GB 2485041 A 5/2012
JP 2002-506728 A 3/2002
JP 2005-507768 A 3/2005
JP 2005-238526 A 9/2005

(56) References Cited

FOREIGN PATENT DOCUMENTS

| | | | |
|---|---|---|---|
| JP | 2007-509744 | A | 4/2007 |
| JP | 2012-192739 | A | 10/2012 |
| WO | 9814314 | A1 | 4/1998 |
| WO | 2007084891 | A2 | 7/2007 |
| WO | 2009046545 | A1 | 4/2009 |
| WO | 2012095838 | A1 | 7/2012 |

OTHER PUBLICATIONS

English Translation of JP Office Action dated Aug. 22, 2017 for JP Application No. 2013215274.
Fluid-Air Products Inc, InvisiPac, Jan. 5, 2013, 12 pages.
MELTEX Corporation; Product Information Sheet; Hot Melt Applicator MP 400; 1 page.
MELTEX GmbH; Product Information Sheet; Hot Melt Applicator MX 2001; 2 pages.
European Patent Application No. 13185893.8: Extended European Search Report dated Apr. 1, 2015, 6 pages.
European Patent Application No. 13185184: Extended European Search Report dated Jun. 6, 2014, 7 pages.
European Patent Application No. 13187639.3: Extended European Search Report dated Feb. 28, 2014, 5 pages.
U.S. Appl. No. 13/799,788: Non-Final Office Action dated Jun. 12, 2014, 24 pages.
European Patent Application No. 13184144.7: European Search Report dated Mar. 25, 2014, 6 pages.

* cited by examiner

ADHESIVE DISPENSING SYSTEM AND METHOD USING SMART MELT HEATER CONTROL

CROSS-REFERENCE TO RELATED APPLICATION

This application is a continuation of U.S. patent application Ser. No. 14/920,832, filed Oct. 22, 2015, and published as U.S. Patent App. Pub. No. 2016/0038966 on Feb. 11, 2016, which is a divisional of U.S. patent application Ser. No. 13/799,737, filed Mar. 13, 2013, issued as U.S. Pat. No. 9,200,741 on Dec. 1, 2015, which claim the benefit of U.S. Provisional Patent App. No. 61/718,311, filed Oct. 25, 2012, the disclosures of which are incorporated by reference herein in their entirety.

FIELD OF THE INVENTION

The present invention generally relates to an adhesive dispensing system, and more particularly, to control components and methods used with heater units that melt adhesive in the adhesive dispensing system.

BACKGROUND

A conventional dispensing system for supplying heated adhesive (i.e., a hot-melt adhesive dispensing system) generally includes an inlet for receiving adhesive materials in solid or liquid form, a heater grid in communication with the inlet for heating and/or melting the adhesive materials, an outlet in communication with the heater grid for receiving the heated adhesive from the heated grid, and a pump in communication with the heater grid and the outlet for driving and controlling the dispensation of the heated adhesive through the outlet. One or more hoses may also be connected to the outlet to direct the dispensation of heated adhesive to adhesive dispensing guns or modules located downstream from the pump. Furthermore, conventional dispensing systems generally include a controller (e.g., a processor and a memory) and input controls electrically connected to the controller to provide a user interface with the dispensing system. The controller is in communication with the pump, heater grid, and/or other components of the dispensing system, such that the controller controls the dispensation of the heated adhesive.

Conventional hot-melt adhesive dispensing systems typically operate at ranges of temperatures sufficient to melt the received adhesive and heat the adhesive to an elevated application temperature prior to dispensing the heated adhesive. In order to ensure that the demand for heated adhesive from the gun(s) and module(s) is satisfied, the adhesive dispensing systems are designed with the capability to generate a predetermined maximum flow of molten adhesive. As throughput requirements increase (e.g., up to 20 lb/hour or more), adhesive dispensing systems have traditionally increased the size of the heater grid and the size of the hopper and reservoir associated with the heater grid in order to ensure that the maximum flow of molten adhesive can be supplied.

However, large hoppers and reservoirs result in a large amount of hot-melt adhesive being held at the elevated application temperature within the adhesive dispensing system. This holding of the hot-melt adhesive at the elevated application temperature may keep the hot-melt adhesive at a high temperature for only about 1 to 2 hours during maximum flow, but most conventional adhesive dispensing systems do not operate continuously at the maximum flow. To this end, adhesive dispensing systems typically operate with long periods of time where the production line is not in use and the demand for molten adhesive is zero, or lower than the maximum flow. During these periods of operation, large amounts of hot-melt adhesive may be held at the elevated application temperature for long periods of time, which can lead to degradation and/or charring of the adhesive, negative effects on the bonding characteristics of the adhesive, clogging of the adhesive dispensing system, and/or additional downtime.

In order to avoid or reduce the amount of degradation caused in the adhesive, several conventional adhesive dispensing systems have included a standby mode. When activated, the standby mode turns off the heat energy applied by the components of the dispensing system, thereby reducing the temperature of the adhesive within the dispensing system. The standby mode is activated based on an input received at the controller from the gun or module, and this input requires the provision of one or more additional wires or cables extending from the gun or module back to the controller. This additional wiring can be unsightly and increases the risk of catching the wire connections onto surrounding structures during operation of the gun or module. Furthermore, the dispensing system generally requires a relatively lengthy (5-30 minute) warm-up time to return the adhesive in the dispensing system back to the elevated application temperature after the dispensing system has been in standby mode for a period of time. These additional delays in warming up the system are undesirable to end users. As a result, substantially all end users do not use the standby mode available in conventional adhesive dispensing systems when that standby mode is the only mechanism provided for avoiding degradation during long periods of inactivity of the adhesive dispensing system.

For reasons such as these, an improved hot-melt adhesive dispensing system, including a control process for further reducing degradation of the adhesive would be desirable.

SUMMARY OF THE INVENTION

According to one embodiment of the invention, a method of dispensing adhesive is performed with an adhesive dispensing system. The method includes operating a heater unit to maintain a unit set point temperature that is sufficient to melt and heat the adhesive to an application temperature. The method also includes determining that the adhesive dispensing system requires a supply of adhesive and then actuating a fill system to supply adhesive to the adhesive dispensing system. Following a supply of adhesive, it is determined whether a first set threshold time has elapsed following the most recent actuation of the fill system. If the first set threshold time has elapsed since this most recent actuation, then the temperature of the heater unit is reduced below the unit set point temperature while continuing to operate the heater unit. This reduces the temperature at which the adhesive is held within the adhesive dispensing system.

In one aspect, the method also includes increasing the temperature of the heater unit back to the unit set point temperature when the fill system is actuated. A timer may be reset upon this actuation of the fill system, and this timer is used to determine whether the first set threshold time has been exceeded since the most recent supply of adhesive. As a result, long periods of relative inactivity or low throughput will automatically cause a cooling of the adhesive, which lowers the degradation rate of the adhesive and minimizes outgassing at an adhesive/air interface within the adhesive dispensing system.

The adhesive dispensing system may also include a reservoir configured to receive heated adhesive from the heater unit, the reservoir including a heating device. In these circumstances, the method may also include operating the heating device to maintain a reservoir set point temperature that maintains the temperature of adhesive within the reservoir, both before and after the first set threshold time has elapsed. As a result, the change in temperature of adhesive at the heater unit caused by the reduction in temperature of the heater unit is limited (such as to about 10° C.), which enables a shorter warm-up time from this smart melt state. To this end, the warm-up time for the heater unit may be so short that dispensing operations proceed immediately without delay when the heater unit is returned from the smart melt state.

Alternatively, the timer may be used to determine whether a second set threshold time has elapsed following the most recent actuation of the fill system. When the second set threshold time has elapsed, the temperature of the reservoir could also be reduced while continuing to operate the heating device, and this increases the change in temperature of the adhesive in the adhesive dispensing system to further reduce degradation of the adhesive. For example, the overall temperature change of adhesive may be an additional 5° C. in such an arrangement. The reduction of the temperature at the reservoir may be offset in time from the reduction of temperature at the heater unit to provide a staged reduction in temperature of the adhesive. The reduction in temperature at the heater unit may also be cycled periodically to pre-emptively warm adhesive back up before a new supply of adhesive is actuated at the fill system.

In another aspect, the smart melt mode may also be accompanied by a standby mode in the adhesive dispensing system. To this end, the time may also determine whether a set standby threshold time has elapsed following the most recent actuation of the fill system. This set standby threshold time will typically be significantly longer than the first set threshold time that determines when the smart melt mode is activated. Once the set standby threshold time has elapsed, the standby mode is activated by turning the heater unit off to stop applying heat energy to the adhesive until the next supply of adhesive to the adhesive dispensing system. Therefore, the benefits of a standby mode may also be combined with the smart melt mode to enable an improved operation of the adhesive dispensing system controlled based on refills or supplies of adhesive into the adhesive dispensing system.

In another embodiment, an adhesive dispensing system includes a heater unit adapted to heat an adhesive to an application temperature, a level sensor for detecting a level of adhesive remaining for melting and heating by the heater unit, and a fill system operative to supply the adhesive to the heater unit. A controller is configured to actuate the fill system to supply adhesive to the adhesive dispensing system whenever the level sensor detects that the level of adhesive is below a refill threshold. The controller also operates the heater unit to maintain a unit set point temperature that is sufficient to melt and heat the adhesive to an application temperature. A timer is operatively coupled to the controller and configured to track an elapsed time since the most recent actuation of the fill system. The controller continues to operate the heater unit while reducing the temperature of the heater unit if the elapsed time exceeds a first set threshold time. In this regard, a smart melt process is enabled to reduce degradation and charring of the adhesive during periods of low throughput from the adhesive dispensing system.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF THE ILLUSTRATIVE EMBODIMENTS

Figure 1:
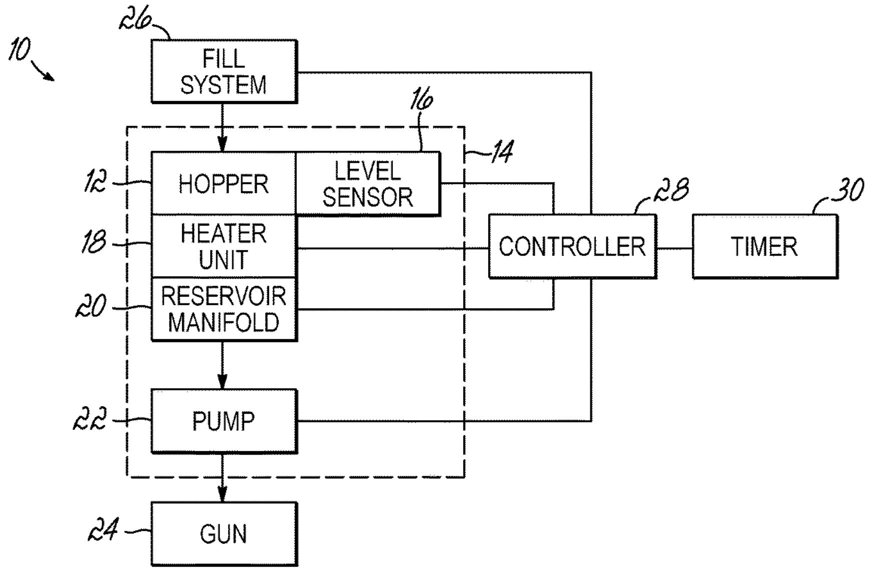
FIG. 1 is a schematic block diagram view of an adhesive dispensing system according to one embodiment of the current invention.
Figure 2:
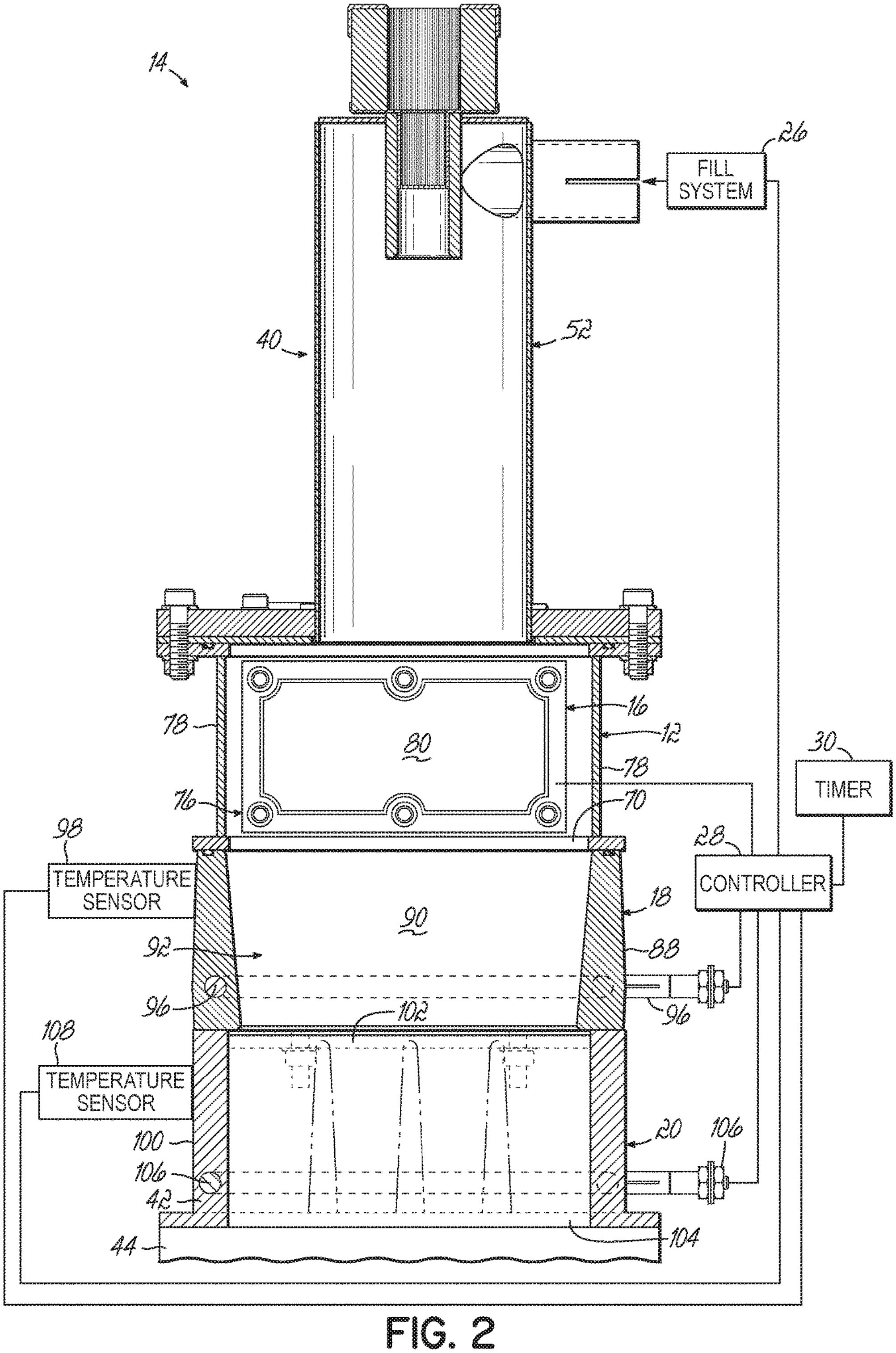
FIG. 2 is a cross-sectional front view of a melt subassembly included in the adhesive dispensing system of FIG. 1.

Referring to FIGS. 1 and 2, an adhesive dispensing system 10 in accordance with one embodiment of the invention is shown. The adhesive dispensing system 10 is configured to optimize the dispensing operation by using a smart melt heater control process to reduce the temperature of hot melt adhesive held within the dispensing system 10 during periods of low throughput. This reduction of temperature is automatically actuated based on the frequency of refilling a hopper 12 within the dispensing system 10, thereby significantly reducing the rate of degradation of the adhesive during the periods of low throughput. Moreover, unlike a standby mode procedure which requires a lengthy warm-up time to return to dispensing operations, the reduction in temperature of the adhesive caused by the smart melt heater process is tailored to enable rapid or immediate warm-up to dispensing operations after a reduction in temperature. In addition, the standby mode may still be used after a long period of time of low throughput has elapsed, but the smart melt heater process reduces the likelihood of degradation for much of the time before a standby mode is necessary, as described in further detail below. Accordingly, degradation caused by holding hot melt adhesive at an elevated application temperature for long periods of time is reduced without requiring any additional wiring or actions taken by the end user of the dispensing system 10.

Before describing the specific operation and functionality associated with the smart melt heater control process, a brief description of an exemplary adhesive dispensing system 10 is provided below. Although this exemplary embodiment of the adhesive dispensing system 10 is described in some detail to explain the structural components that may be used to perform the advantageous smart melt heater control process, it will be appreciated that the control process of this invention may be used with adhesive dispensing systems having different arrangements of components without departing from the scope of the invention. With particular reference to FIG. 1, an exemplary adhesive dispensing system 10 may include a melt subassembly 14 having the aforementioned hopper 12, a level sensor 16, a heater unit 18 receiving adhesive from the hopper 12, and a reservoir/manifold 20 receiving adhesive from the heater unit 18. The melt subassembly 14 also includes a pump 22 configured to deliver heated adhesive from the reservoir/manifold 20 to a dispenser gun 24 or module. Each of these elements of the melt subassembly 14 is described in further detail below. The adhesive dispensing system 10 also includes a fill system 26 operable to deliver solid or semi-solid adhesive material to the hopper 12 to refill the hopper 12 when the level of adhesive material in the adhesive dispensing system 10 becomes low. Therefore, as the heater unit 18 and pump 22 operate to supply molten adhesive material to the gun 24 for dispensing onto a substrate, the hopper 12 periodically empties and the fill system 26 periodically supplies adhesive to refill the adhesive dispensing system 10 when this occurs.

The adhesive dispensing system 10 shown in FIG. 1 also includes a controller 28 for operating various components of the dispensing system 10. As shown by connection lines in FIG. 1, the controller 28 is operatively connected to the fill system 26, the level sensor 16, the pump 22, and heating devices (not shown in FIG. 1) in the heater unit 18 and in the reservoir/manifold 20. The controller 28 includes a processor and a memory (not shown), and also program code resident in the memory and configured to be executed by the processor. As described in further detail below, the program code operates to monitor levels of adhesive in the hopper 12, actuate refilling operations by the fill system 26, and control the heat energy applied at the heater unit 18 and/or at the reservoir/manifold 20 to reduce degradation of adhesive material held within the melt subassembly 14. To this end, the controller 28 includes or is connected to a timer 30 configured to measure the elapsed time since the most recent refilling operation of the fill system 26. As a result, the controller 28 can use the smart melt heater control process to reduce the temperature of adhesive at the melt subassembly 14 when the elapsed time since a refilling operation exceeds a threshold time, which indicates that the dispensing system 10 is currently operating with low throughput. This reduction in temperature is sufficient to significantly reduce the degradation rate of the adhesive in the melt subassembly 14 while also being small enough to enable rapid or immediate warm-up or recovery to an elevated application temperature when the throughput is increased again. It will be understood that the smart melt heater control process may be used with other types of dispensing systems having a different arrangement of components without departing from the scope of this invention.

The exemplary adhesive dispensing system 10 shown schematically in FIG. 1 is illustrated in further detail in FIG. 2. Many of the components of the adhesive dispensing system 10 are also described in co-pending U.S. patent application Ser. No. 13/799,622 to Clark et al., entitled "Adhesive Dispensing Device having Optimized Reservoir and Capacitive Level Sensor," the disclosure of which is hereby incorporated by reference herein in its entirety.

With reference to FIG. 2, a cyclonic separator unit 40 may be mounted on top of the hopper 12 and is separated from the reservoir/manifold 20 by the heater unit 18 and the hopper 12. Thus, a generally gravity-driven flow of adhesive is caused from the cyclonic separator unit 40 to the heater unit 18 for melting, and then from the heater unit 18 into the reservoir/manifold 20. The reservoir/manifold 20 includes a reservoir 42 coupled to the heater unit 18 and a manifold 44 coupled to the reservoir 42 on an opposite side from the heater unit 18. To this end, the manifold 44 defines a bottom surface of the reservoir 42. Although these elements are shown as separate elements in FIG. 2, it will be understood that the reservoir/manifold 20 could alternatively be formed as a unitary integral member. Moreover, the reservoir 42 may be defined by a larger melt tank, and the manifold 44 may be positioned a distance away from the reservoir 42 rather than being located adjacent to the reservoir 42 in other embodiments. The manifold 44 of the exemplary embodiment includes various conduits extending to the pump 22 (not shown in FIG. 2) and to one or more outlets leading to the dispenser gun(s) 24. In sum, the melt subassembly 14 operates to receive solid adhesive from the fill system 26, melt and heat the adhesive, and deliver the molten adhesive to the dispenser gun 24.

With continued reference to FIG. 2, the cyclonic separator unit 40 receives adhesive pellets driven by a pressurized air flow through an inlet hose (not shown) leading to the fill system 26. The cyclonic separator unit 40 includes a generally cylindrical pipe 52, which receives the flow of adhesive pellets and air and decelerates this flow before depositing the adhesive pellets into the hopper 12. The hopper 12 defines an enclosure that may be positioned adjacent to the cyclonic separator unit 40, the enclosure including an open bottom 70 communicating with the heater unit 18. Although the term "hopper" is used throughout the description of this exemplary embodiment of the adhesive dispensing system 10, it will be understood that alternative structures may be provided for feeding the solid adhesive from the fill system 26 into the heater unit 18. In this regard, the hopper 12 may be defined by or replaced with a receiving space or chamber of any shape and size configured to feed the adhesive into the heater unit 18 in other embodiments consistent with the scope of the invention.

The level sensor 16 is provided in the hopper 12 for monitoring the level of adhesive in the adhesive dispensing system 10. For example, the level sensor 16 may include a capacitive level sensor in the form of a plate element 76 mounted along one of the peripheral sidewalls 78 of the hopper 12. The plate element 76 includes one driven electrode 80, and a portion of the sidewall 78 or another sidewall

78 of the hopper 12 acts as a second (ground) electrode of the level sensor 16. For example, the plate element 76 may also include a ground electrode in some embodiments. The level sensor 16 determines the amount or level of adhesive material in the adhesive dispensing system 10 by detecting with the plate element 76 where the capacitance level changes between the driven electrode 80 and ground (e.g., open space or air in the hopper 12 provides a different capacitance than the adhesive material in the hopper 12). The level sensor 16 is connected with the controller 28 and provides information corresponding to the level of adhesive within the adhesive dispensing system 10 to the controller 28. More specifically, the exemplary level sensor 16 shown in FIG. 2 may operate to provide indications corresponding to the adhesive level passing multiple threshold levels in the hopper 12 (e.g., a first threshold level where refill will be needed soon and a second threshold level also referred to as a refill threshold, in which refill is requested immediately from the fill system 26). Alternatively, the level sensor 16 may be replaced by multiple smaller level sensors (not shown) connected to the controller 28 that each sense whether adhesive is located at a particular level, thereby providing similar indications as the larger level sensor 16 shown in FIG. 2. The level sensor 16 therefore enables further refinement of the smart melt heater control process described below by providing information to the controller 28 regarding when supply of the adhesive to the adhesive dispensing system 10 is about to occur and when the supply is necessary.

The heater unit 18 of the exemplary embodiment includes a peripheral wall 88 and a plurality of partitions 90 extending across the space between the hopper 12 and the reservoir 42. In this regard, the heater unit 18 of the exemplary embodiment is in the form of a heater grid. The heater unit 18 therefore defines a plurality of openings 92 through the heater unit 18 and between the partitions 90 for flow of the adhesive. It will be understood that the plurality of openings 92 may be defined by different structure than grid-like partitions in other embodiments of the heater unit 18, including, but not limited to, fin-like structures extending from the peripheral wall 88, without departing from the scope of the invention. In this regard, the "heater unit" 18 may even include a non grid-like structure for heating the adhesive in other embodiments of the invention, as the only necessary requirement is that the heater unit 18 provide one or more openings 92 for flow of adhesive through the adhesive dispensing system 10. With respect to the exemplary embodiments described below, the heater unit 18 may be referred to as a heater grid normally operating at a grid set point temperature (or a unit set point temperature), but this use of the term grid is not intended to preclude these alternative structures for the heater unit 18 within the scope of the current invention.

The peripheral wall 88 is configured to receive a heating element 96 such as a resistance heater, a tubular heater, a heating cartridge, or another equivalent heating element, which may be inserted or cast into the heater unit 18. The heating element 96 receives signals from the controller 28 and applies heat energy to the heater unit 18, which is conducted through the peripheral wall 88 and the partitions 90 (or the alternative structure for the heater unit 18 as described above) to transfer heat energy to the adhesive material flowing through the openings 92, as well as to the hopper 12 and reservoir 42 via conduction. The heater unit 18 may also include one or more sensors configured to provide operational data to the controller 28 such as the temperature of the heater unit 18 (referred to as a grid set point temperature in several instances below). For example, the exemplary embodiment of the heater unit 18 includes a temperature sensor 98 to detect the temperature of the heater unit 18. The temperature sensor 98 is positioned to sense the temperature at the peripheral wall 88 and may indirectly sense the adhesive temperature as well, although it will be understood that the adhesive temperature tends to lag behind the temperature changes of the heater unit 18 by a small margin. This detected temperature may be used to control the heat energy output by the heating element 96 of the heater unit 18, such as during the operation of the smart melt heater control process. It will be understood that a plurality of additional sensors may be located within the heater unit 18 and various elements of the melt subassembly 14 for communication with the controller 28 to monitor the accurate operation of the adhesive dispensing system 10.

The reservoir 42 includes a peripheral wall 100 extending between an open top end 102 communicating with the heater unit 18 and an open bottom end 104 communicating with and bounded by the manifold 44. At least one of the reservoir 42 and the manifold 44 includes a heating device 106 in the form of a resistance heater, a tubular heater, a heating cartridge, or another similar type of heating element inserted or cast into position at the reservoir 42 or manifold 44 for applying heat energy at these locations downstream of the heater unit 18 to the adhesive. The heating device 106 receives signals from the controller 28 and applies heat energy to the adhesive in the reservoir/manifold 20. The reservoir 42 may also include one or more sensors configured to provide operational data to the controller 28 such as the temperature of the reservoir 42 (referred to as a reservoir set point temperature in several instances below). For example, the exemplary embodiment of the reservoir 42 includes a temperature sensor 108 to detect the temperature at the peripheral wall 100 of the reservoir 42. Similar to the temperature sensor 98 described above, the temperature sensor 108 at the reservoir may alternatively extend like a probe into the adhesive at the reservoir 42 in other embodiments. This detected temperature may be used to control the heat energy output by the heating device 106 in the reservoir/manifold 20, such as during the operation of the smart melt heater control process.

In operation, the heater unit 18 is brought up to temperature by the heating element 96 and the reservoir/manifold 20 is brought up to temperature by the heating device 106, such that the adhesive is heated up to the desired elevated application temperature. The controller 28 will receive a signal from the temperature sensors 98, 108 when the elevated application temperature has been reached, which indicates that the melt subassembly 14 is ready to deliver molten adhesive. The pump 22 then operates to remove molten adhesive material from the reservoir 42 as required by the downstream guns 24. As the pump 22 removes adhesive material, gravity causes at least a portion of the remaining adhesive material to move downwardly into the reservoir 42 from the hopper 12 and the heater unit 18. The lowering of the level of adhesive pellets within the hopper 12 is sensed by the level sensor 16, and a signal is sent to the controller 28 indicating that more adhesive pellets should be delivered to the melt subassembly 14. The controller 28 then sends a signal that actuates delivery of adhesive pellets from the fill system 26 through the cyclonic separator unit 40 and into the hopper 12 to refill the hopper 12. This process continues as long as the adhesive dispensing system 10 is in active operation.

Figure 3:
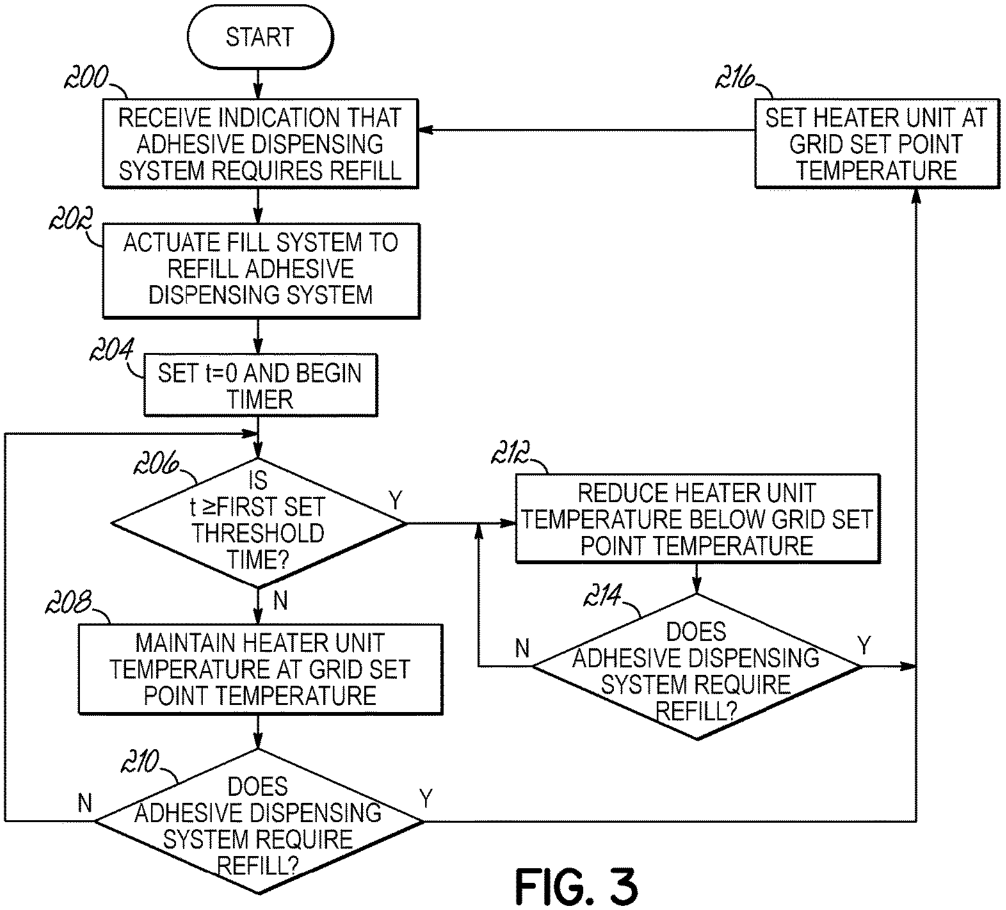
FIG. 3 is a flowchart illustrating a series of operations performed by a controller of the adhesive dispensing system of FIG. 1, according to a first embodiment of the method used with the adhesive dispensing system.

With reference to FIG. 3, the controller 28 is also configured to perform the series of operations defining the smart melt heater control process, one embodiment of which is shown in flowchart form in that Figure. Regardless of the particular structure used to form the adhesive dispensing system 10, the controller 28 receives feedback from a level sensor 16 and from one or more temperature sensors 98, 108 and sends actuation signals to one or more heating elements 96, 106 in order to perform the smart melt heater control process. To this end, the controller 28 receives an indication that the adhesive dispensing system 10 requires a refill (block 200). For example, and as described above, the controller 28 may receive a signal from the level sensor 16 in the hopper 12 indicating that the level of adhesive material has dropped below some set threshold. To prevent the hopper 12 from running completely out of adhesive and then uncovering the heater unit 18, the controller 28 sends a signal to actuate the fill system 26 to supply the adhesive dispensing system 10 with adhesive (block 202). Whenever this refilling occurs, the controller 28 also sets a variable $t=0$ and causes the timer 30 to begin measuring the elapsed time $t$ from the refilling operation (block 204). The controller 28 therefore monitors the gaps of time between each actuation of the fill system 26. As will be readily understood, more rapid refilling operations are indicative that the adhesive dispensing system 10 is performing at high volume throughput, meaning that the dispenser guns 24 are outputting adhesive at a relatively high rate.

The controller 28 then determines whether the elapsed time $t$ is greater than or equal to a first set threshold time for actuating the smart melt mode (block 206). The first set threshold time may be automatically pre-set in the controller 28 before delivery to an end user to a specific time period that indicates a difference between low throughput of the dispensing system 10 and high throughput of the dispensing system 10. In the exemplary embodiment, the first set threshold time may be set anywhere within a range of about 5 minutes to about 60 minutes. More specifically, the first set threshold time may be set to be about 10 minutes. If the elapsed time does not exceed the first set threshold time, the controller 28 operates the heater unit 18 (and more specifically, the heating element 96 of the heater unit 18) to maintain the temperature of the heater unit 18 at a grid set point temperature used during regular operation of the melt subassembly 14 (block 208). In other words, unless the time elapsed since the latest refill of adhesive exceeds the first set threshold time, the heater unit 18 maintains a temperature at the grid set point temperature that is sufficient to melt and heat the adhesive to the elevated application temperature. The controller 28 then determines whether the adhesive dispensing system 10 requires a refill (block 210). If the adhesive dispensing system 10 does not require a refill, the controller 28 returns to block 206 to check again if the first set threshold time has been exceeded. If the adhesive dispensing system 10 does require a refill, then the controller 28 returns to block 200 and begins the process again for timing the gap between fill system 26 actuations.

If, on the other hand, it is determined that the elapsed time since the most recent refill of the adhesive dispensing system 10 does exceed the first set threshold time, the controller 28 operates in the smart melt mode by continuing to operate the heater unit 18 while reducing the temperature of the heater unit 18 below the grid set point temperature used during normal operation (block 212). For example, the controller 28 may turn the desired temperature down by anywhere in the range of about 6° C. to about 220° C. In one particular example, the controller 28 operates the heater unit 18 to be at a temperature 20° C. less than the grid set point temperature. As a result of the heat energy still being applied at the reservoir/manifold 20 by the heating device 106, the adhesive at the heater unit 18 and at the hopper 12 will be maintained at a slightly cooler temperature such as, for example, 10° C. below the elevated application temperature during the smart melt mode.

Test results have shown that the degradation rate of some hot melt adhesives can be reduced by more than 50% for each 10° C. drop in temperature, so this small change in temperature has a substantial effect on slowing the degradation of the adhesive in the melt subassembly 14. Moreover, the change in temperature in the adhesive remains small enough to enable rapid recovery to the elevated application temperature in the adhesive dispensing system 10 when required after a new refill of the adhesive dispensing system 10. This rapid recovery ideally does not affect or delay any dispensing operations because even in the smart melt mode, there will still be some adhesive at the reservoir/manifold 20 that is held at the elevated application temperature and ready for dispensing. Furthermore, the temperature of the hot melt adhesive is advantageously reduced at the location where an interface is formed between the adhesive and the air in the hopper 12. In addition to the reduced degradation rate, the reduction of temperature at the air/adhesive interface is believed to provide less outgassing from the adhesive within the hopper 12, thereby improving the performance of the adhesive dispensing system 10.

Continuing from block 212 of the smart melt heater control process, the controller 28 then checks whether the adhesive dispensing system 10 requires a refill (block 214). If the adhesive dispensing system 10 does not require a refill, the controller 28 returns to block 212 and continues in the smart melt mode. If the adhesive dispensing system 10 does require a refill, then the controller 28 returns to block 200 after resetting the temperature of the heater unit 18 back to the grid set point temperature (block 216), and therefore begins the process again for timing the gap between fill system 26 actuations. By using the smart melt mode in the manner indicated, the adhesive can still be delivered at the elevated application temperature in periods of high throughput, but the adhesive is cooled slightly to reduce or avoid degradation during long periods between refills, such as during periods of low throughput. In this regard, some of the benefits of a standby mode (less degradation/charring) are achieved in the background processing of the controller 28 without requiring a complete shutdown and long warm-up or recovery time. In addition, no positive action must be taken by the end user of the dispensing system 10 to operate the smart melt mode, as it automatically actuates in the background to improve the operation of the dispensing system 10.

Figure 4:
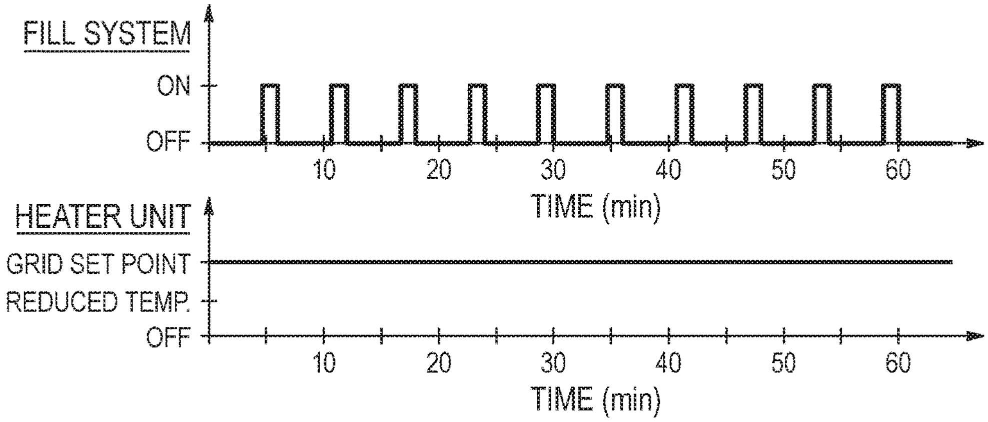
FIG. 4 is a time graph showing the operational states of a fill system and a heater unit of the adhesive dispensing system of FIG. 1 operating the series of operations of FIG. 3 during a period of high volume throughput.
Figure 5:
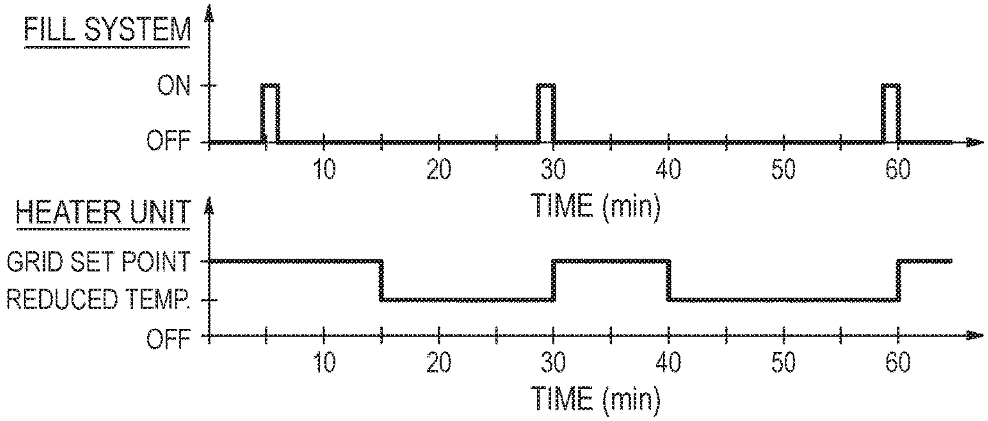
FIG. 5 is a time graph showing the operational states of the fill system and the heater unit of the adhesive dispensing system of FIG. 1 operating the series of operations of FIG. 3 during a period of low volume throughput.

The beneficial operation of the adhesive dispensing system 10 during the series of operations shown in FIG. 3 is shown in graphical form in FIGS. 4 and 5. To this end, FIG. 4 illustrates a schematic representation of ON/OFF signals for the fill system 26 and temperature set point levels for the heater unit 18 during a period of high throughput, and FIG. 5 illustrates the same signals during a period of low throughput. More specifically, in FIG. 4 the throughput of adhesive delivered by the melt subassembly 14 is high enough to require a refill of the hopper 12 about every 6 or 7 minutes. Assuming that the first set threshold time for actuating the smart melt mode is about 10 minutes, the smart melt mode will not be used during this period of high throughput. Therefore, the heater unit 18 remains at the grid set point temperature throughout the time period of about 60 minutes shown in order to keep melting and heating adhesive to the desired elevated application temperature. Of course, the "Grid Set Point" signal for the heater unit 18 refers only to the amount of actuation of the heating element 96 required to maintain the heater unit 18 at the grid set point temperature. As discussed above, the use of the term "Grid Set Point" is used for explanation purposes only and is not limiting of the structure of the heater unit 18. In real dispensing systems 10, the heating element 96 is cycled on and off many times during this "Grid Set Point" signal and may be active only about 50-80% of the total time in order to maintain the heater unit 18 at the grid set point temperature. However, this state of the heater unit 18 is shown as a constant state for the sake of simplicity.

Turning to FIG. 5, during a period of low throughput, the adhesive dispensing system 10 may only require refill every 25-30 minutes. In such a case, and where the first set threshold time is again about 10 minutes, the heater unit 18 remains in the "Grid Set Point" state at the grid set point temperature whenever these refills occur and for about 10 minutes thereafter. However, as the adhesive dispensing system 10 goes longer than 10 minutes between refills, the smart melt mode is activated by turning the heater unit 18 down to a "Reduced Temperature" state whenever the elapsed time from a refill exceeds the 10 minute set threshold time (e.g., at time=15 minutes and time=40 minutes in FIG. 5). As a result, the adhesive which is moving through the melt subassembly 14 at a slower pace is not held at the elevated application temperature for long periods of time, thereby reducing the overall rate of degradation and charring that may occur. As noted above, the adhesive may be changed in temperature only about 10° C. during these periods of inactivity by the heater unit 18 as a result of the heat being transmitted and conducted from the heating device 106 in the reservoir/manifold 20 up to the hopper 12, but such a change in temperature is sufficient to significantly reduce degradation by half or more. Therefore, the smart melt mode enabled and automatically performed by the smart melt heater control process reduces degradation of adhesive during period of low throughput without any action required on the part of the end user and without any requirement for an expensive and maintenance-intensive sensor located below the heater unit 18 in the melt subassembly 14. The warm-up or recovery period is also minimized to avoid disruptions to the operations of the adhesive dispensing system 10.

It will be understood that the smart melt heater control process may be modified in other embodiments. For example, the specific set threshold time and the specific amount that the heater unit 18 is turned down by the controller 28 during the smart melt mode may be modified without departing from the invention. If it becomes desired to turn off the smart melt mode, then each of these values (set threshold time, and change in unit temperature) could be set to zero. In addition, more heating elements may be provided at various locations in the adhesive dispensing system 10, such as at the hopper 12. In embodiments with multiple heating elements, the smart melt heater control process may be modified by staging the reduction in temperature of the multiple heating elements over time. In this regard, if independent heating elements are provided at multiple components of the adhesive dispensing system 10 (such as the hopper 12, the heater unit 18, and the reservoir 42), the controller 28 may turn down the set point of only the heater unit 18 after a first set threshold time, and then the controller 28 may turn down the set point of the heater unit 18 as well as the reservoir 42 after a second set threshold time. As a result, the lowering of the adhesive temperature can be staged to limit the amount of warm-up time required to return from the smart melt heater control process in circumstances where the smart melt state is actuated for only brief periods of time.

Figure 6:
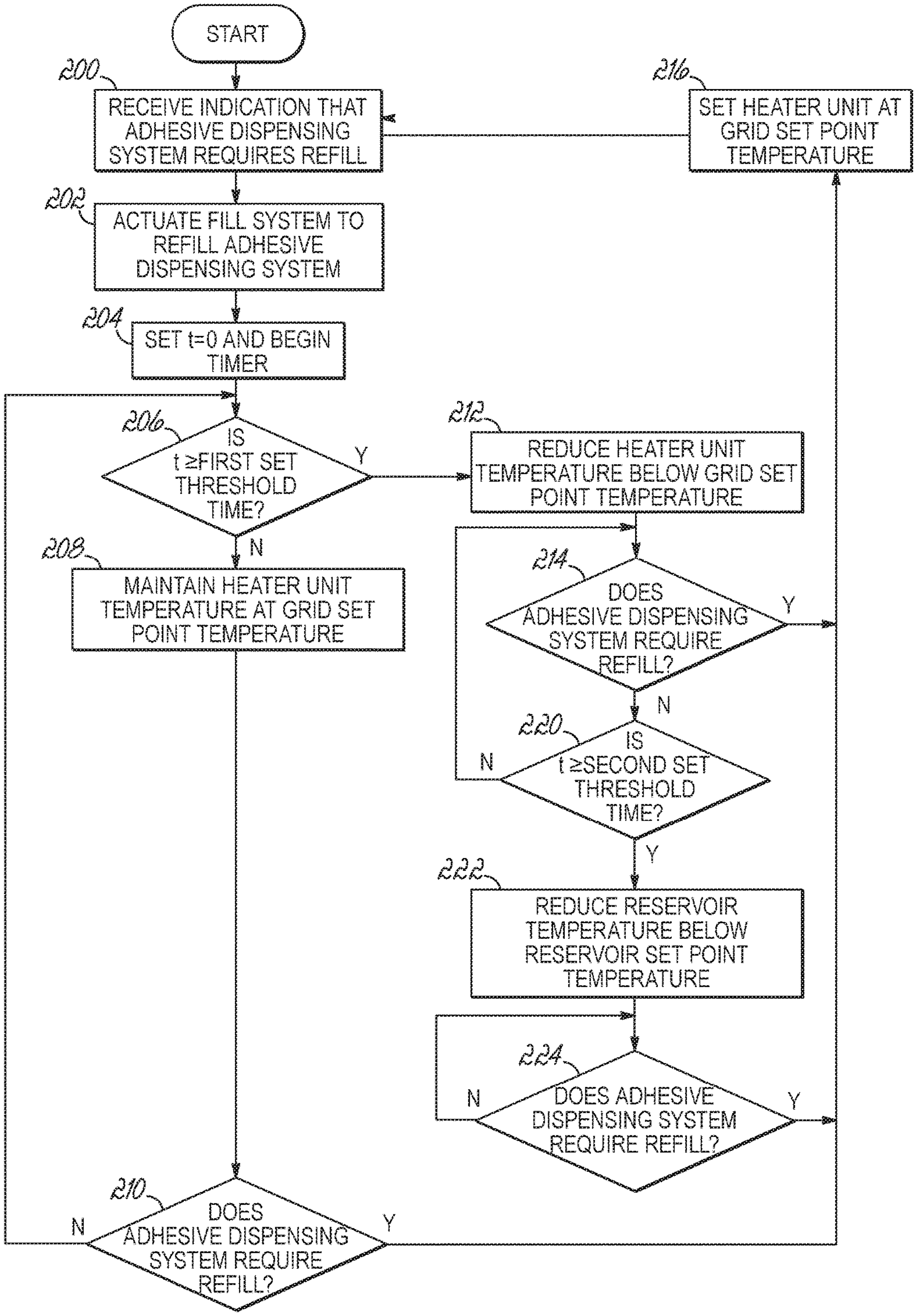
FIG. 6 is a flowchart illustrating a series of operations performed by a controller of the adhesive dispensing system of FIG. 1, according to another embodiment of the method used with the adhesive dispensing system.

With reference to FIG. 6, the controller 28 may operate a slightly modified series of operations defining a smart melt mode in accordance with the example discussed above. To this end, a staged reduction of temperature of the adhesive in the adhesive dispensing system 10 is enabled by multiple heating elements being located in the adhesive dispensing system 10. The modified series of operations includes each of steps 200 through 214 described above with reference to the first embodiment described in FIG. 3, and these steps are not described again in detail below. Consequently, the method of operations for the controller 28 shown in FIG. 6 includes the determination of whether an elapsed time since the most recent refill of the adhesive dispensing system 10 exceeds a first set threshold, and the heater unit 18 is reduced in temperature below a grid set point temperature if the elapsed time does exceed the first set threshold.

Continuing with the additional steps in FIG. 6, the series of operations continues in a different manner than previously described following the determination that the adhesive dispensing system 10 does not require a refill at block 214. As described above, this determination is performed after the smart melt mode has been entered at block 212 by reducing the heater unit temperature below a grid set point temperature. In this embodiment, the method then continues by determining if the elapsed time t exceeds a second set threshold time (block 220). If the elapsed time t does not exceed the second set threshold time, then the controller 28 returns to block 214 to determine whether the adhesive dispensing system 10 requires refill again. If the second set threshold time has elapsed, then the controller 28 continues to operate the heating device 106 while reducing the temperature at the reservoir 42 by turning down the heating device 106 at the reservoir 42 below a reservoir set point temperature (block 222). For example, the heating device 106 may be turned down 5° C. when the second set threshold time has elapsed, and this further cools the adhesive within the adhesive dispensing system 10. Thus, the adhesive is cooled in a stepwise manner over longer periods of time to enhance reduction of adhesive degradation while also continuing to limit the warm-up or recovery time as much as possible in the smart melt mode.

After the temperature at the reservoir 42 has been reduced, the controller 28 determines whether the adhesive dispensing system 10 requires a new supply of adhesive (block 224). If a refill of adhesive is not required, the controller 28 loops back to block 224 to continue monitoring whether the adhesive dispensing system 10 requires a refill of adhesive. During this cycling of the controller 28, the smart melt mode remains active with both the heater unit 18 and the reservoir 42 turned down from their respective set points to enhance the cooling of the adhesive. Once the controller 28 determines at block 224 that a refill of adhesive is required, then the controller 28 returns to block 216 to set the heater unit 18 back to the grid set point temperature (and the reservoir 42 back to the reservoir set point temperature, if necessary) and then to block 200 to start the process of refilling the adhesive dispensing system 10 again. This sequence of operations shown in FIG. 6 enhances the benefits of the smart melt mode for the reasons described above.

Figure 7:
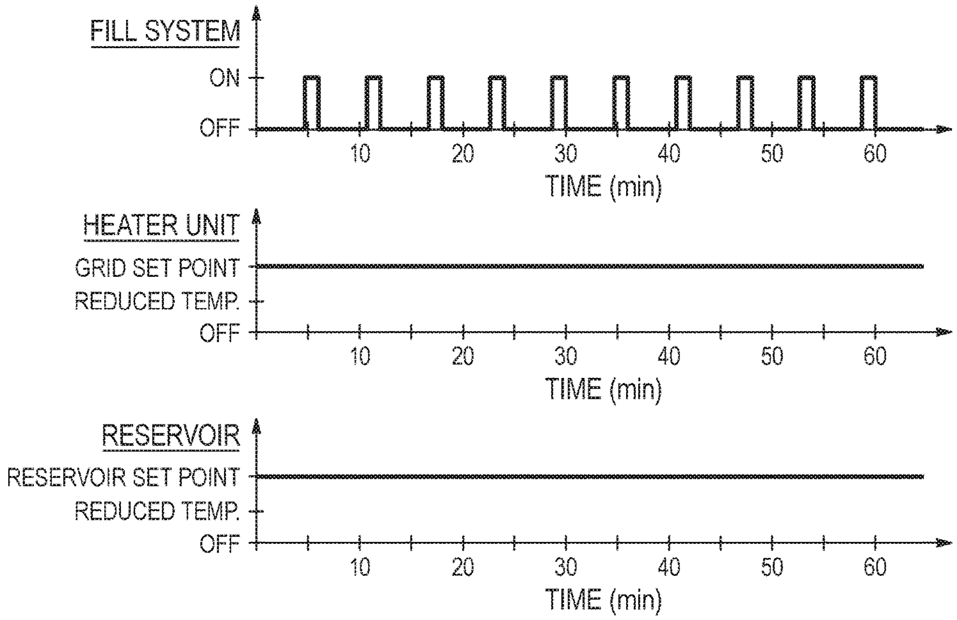
FIG. 7 is a time graph showing the operational states of a fill system, a heater unit, and a reservoir of the adhesive dispensing system of FIG. 1 operating the series of operations of FIG. 6 during a period of high volume throughput.
Figure 8:
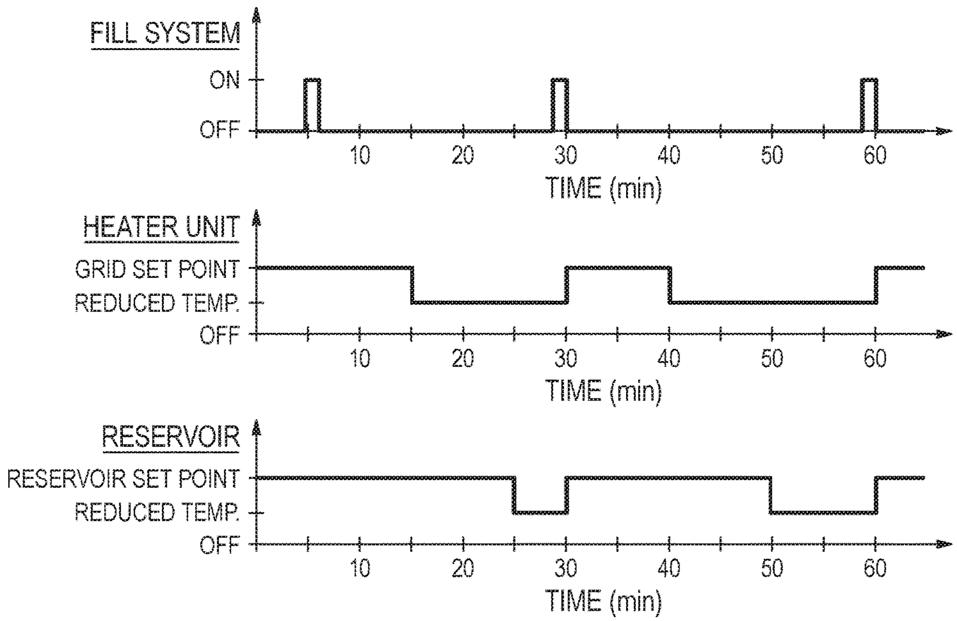
FIG. 8 is a time graph showing the operational states of a fill system, a heater unit, and a reservoir of the adhesive dispensing system of FIG. 1 operating the series of operations of FIG. 6 during a period of low volume throughput.

The beneficial operation of the adhesive dispensing system 10 during the series of operations shown in FIG. 6 is shown in graphical form in FIGS. 7 and 8. To this end, FIG. 7 illustrates a schematic representation of ON/OFF signals for the fill system 26 and temperature set point levels for the heater unit 18 and reservoir 42 during a period of high throughput, and FIG. 8 illustrates the same signals during a period of low throughput. More specifically, in FIG. 7 the throughput of adhesive delivered by the adhesive dispensing system 10 is high enough to require a refill of adhesive using the fill system 26 about every 6 or 7 minutes. Assuming that the first set threshold time for actuating the smart melt mode is about 10 minutes, the smart melt mode will not be used during this period of high throughput. Therefore, the heater unit 18 remains at the grid set point temperature and the reservoir 42 remains at the reservoir set point temperature throughout the time period of about 60 minutes shown, in order to keep melting and heating adhesive to the desired elevated application temperature. Of course, the "Grid Set Point" signal for the heater unit 18 refers only to the amount of actuation of the heating element 96 required to maintain the heater unit 18 at the grid set point temperature. In real dispensing systems 10, the heating element 96 is cycled on and off many times during this "Grid Set Point" signal and may be active only about 50-80% of the total time in order to maintain the heater unit 18 at the grid set point temperature. However, this state of the heater unit 18 is shown as a constant state for the sake of simplicity. The same logic applies to the constant signal shown for the sake of simplicity in the reservoir graph.

Turning to FIG. 8, during a period of low throughput, the adhesive dispensing system 10 may only require refill every 25-30 minutes. In such a case, and where the first set threshold time is about 10 minutes and the second set threshold time is about 20 minutes, the heater unit 18 remains in the "Grid Set Point" state at the grid set point temperature whenever these refills occur and for about 10 minutes thereafter. However, as the adhesive dispensing system 10 goes longer than 10 minutes between refills, the smart melt mode is activated by turning the heater unit 18 down to a "Reduced Temperature" state whenever the elapsed time from a refill exceeds the 10 minute set threshold time (e.g., at time=15 minutes and time=40 minutes in FIG. 8). As a result, the adhesive which is moving through the melt subassembly 14 at a slower pace is not held at the elevated application temperature for long periods of time, thereby reducing the overall rate of degradation and charring that may occur. As noted above, the adhesive may be changed in temperature only about 10° C. during these periods of inactivity by the heater unit 18 as a result of the heat being transmitted and conducted from the heating device 106 in the reservoir/manifold 20, but such a change in temperature is sufficient to significantly reduce degradation by half or more.

In this embodiment, the smart melt mode is staged so that after twenty minutes following a refill (e.g., at time=25 minutes and t=50 minutes in FIG. 8), the reservoir 42 is turned down from a "Reservoir Set Point" to a "Reduced Temperature" until the next refill is actuated. Thus, over the five minute period of time leading to the refill at t=30 minutes and the ten minute period of time leading to the refill at t=60 minutes shown in the graph, the temperature of the adhesive is further reduced to enhance the reduction of degradation and charring that may occur over the longer periods of time. However, the warm-up or recovery period remains substantially minimized to avoid significant disruptions to the operations of the adhesive dispensing system 10. Even more degradation of the adhesive is avoided in this embodiment, with only a minimal addition to warm-up or recovery time. Once again, the minimized warm-up time may not affect dispensing operations because the temperature of some of the adhesive at the reservoir/manifold 20 may still be maintained at a high enough temperature for dispensing immediately at the end of the smart melt mode. Consequently, the staged reduction of temperature of the adhesive using this embodiment of the smart melt mode is another method of improving the use of adhesive dispensing systems 10.

In another alternative, the controller 28 may operate the smart melt heater control process in an adaptive manner that anticipates and adjusts operation of the heating elements 96, 106 based upon previous operational cycles of the adhesive dispensing system 10. To this end, the controller 28 may monitor the average or typical period of time between refills of the adhesive dispensing system 10 over a plurality of emptying and refill cycles. For example, the controller 28 would determine in the high throughput scenario shown in FIGS. 4 and 7 that the adhesive dispensing system 10 is being refilled every six minutes, while the controller 28 would determine in the low throughput scenario shown in FIGS. 5 and 8 that the adhesive dispensing system 10 is being refilled about every 27 minutes. Based on this average or typical time between recent refill actuations, the controller 28 can be programmed to anticipate the next refill actuation before the low level signal is received from the level sensor 16, and then actuate the heating element 96 to begin reheating the adhesive to the grid set point temperature before the refill is actuated. Although this anticipatory reheating may not always be activated before the refill signal is generated, the reheating should begin earlier for most dispensing/refill cycles and any possible downtime for warming up is minimized.

More generally, the controller 28 in this embodiment would store a first threshold time X, which corresponds to the time that must elapse following a refill before the smart melt mode is activated, and a set preemptive reheating threshold time Y, which corresponds to a time that must elapse following the activation of the smart melt mode before the heating element 96 is turned back up to the grid set point temperature in advance of the next refill. If the example of FIGS. 5 and 8 with about 27 minutes between refill actuations, the first threshold time may be 10 minutes, for example, and the set preemptive reheating threshold time may be 15 minutes, for example. Those values for X and Y in this example would permit cooling of the adhesive for 15 out of every 27 minutes between refill cycles, while also minimizing or eliminating warm-up time by beginning the warm-up process about two minutes before the expected refill. Of course, the variables X and Y could be modified as the operational cycles change over time, thereby adapting to the normal operational cycles of the adhesive dispensing system 10 at the current time. The specific X and Y values could be modified per the preferences of the end user as well. The controller 28 in this embodiment effectively learns patterns over time and adapts to the operation of the adhesive dispensing system 10 to enable the smart melt heater control process while incurring no disruption to the dispensing capability of the system 10.

Alternatively, the pre-emptive warm-up of the adhesive in the hopper 12 may be achieved without using the set preemptive reheating threshold time Y in other embodiments. More specifically, the level sensor 16 (or plurality of level sensors) may be designed to detect the level of adhesive passing multiple thresholds in the hopper 12. For example, the level sensor 16 shown in FIG. 2 may be large enough to provide a first indication when the level of adhesive drops below a first level threshold a short time before refill will be required, and a second indication when the level of adhesive drops below a second level threshold (also referred to as a refill threshold) indicating a nearly empty hopper 12. In such an arrangement, the controller 28 could activate the warm-up process whenever the heating element 96 is turned down in the smart melt mode and the level of adhesive is detected to drop below the first level threshold. Then, when the level of adhesive drops below the second level threshold, the warm-up process has already been commenced or completed by the time that the refill is actuated at the fill system 26. Similar to the previous embodiment, this control process removes or reduces any warm-up time required when ending a smart melt mode at a refill of the hopper 12. It will also be understood that if the second indication is not received within a threshold time of the first indication (and the corresponding turning on and heating of the heating element 96), the controller 28 could actuate the smart melt mode again by turning down the temperature at the heating element 96.

In yet another embodiment of the smart melt heater control process, the controller 28 may be configured to cycle the smart melt mode on and off according to a predetermined schedule. For example, the controller 28 may be programmed to (1) initiate the smart melt mode with reduced temperatures at the heater unit 18 after a first amount of time, (2) set the heating element 96 back to the grid set point temperature after a second amount of time, and (3) repeat steps 1 and 2 until a refill is actuated, which resets the timer for the control process. In embodiments of the adhesive dispensing system 10 with low throughput, for example, this modified control process would avoid longer warm-up times while maintaining substantially all of the benefits of the smart melt mode. Rather than let the adhesive cool significantly over a 50 minute period of time (when the threshold time for activating the smart melt mode is 10 minutes, for example), the smart melt mode may be cycled on and off every 20 minutes within that larger period of time. After 20 minutes of operating in the smart melt mode, the heating element 96 is actuated to heat back up to the grid set point temperature, and once that temperature is achieved, the smart melt mode may begin again. Thus, over longer periods of intervals between refills, the adhesive will not be cooled to such an extent that a long warm-up time is required at the next refill. The cycling of the smart melt mode on and off in longer intervals maintains the benefits of the smart melt mode while minimizing any potential warm-up time drawbacks. In addition, the smart melt mode of this embodiment or of the embodiments described above can be combined with a standby mode that shuts down the heater unit 18 after extended periods of low throughput or inactivity. A sample series of operations mixing the smart melt mode with the standby mode is provided in FIG. 9 below. It will be understood that other modifications are possible without departing from the primary scope and benefits of the smart melt heater control process and the adhesive dispensing system 10 of the present invention.

Figure 9:
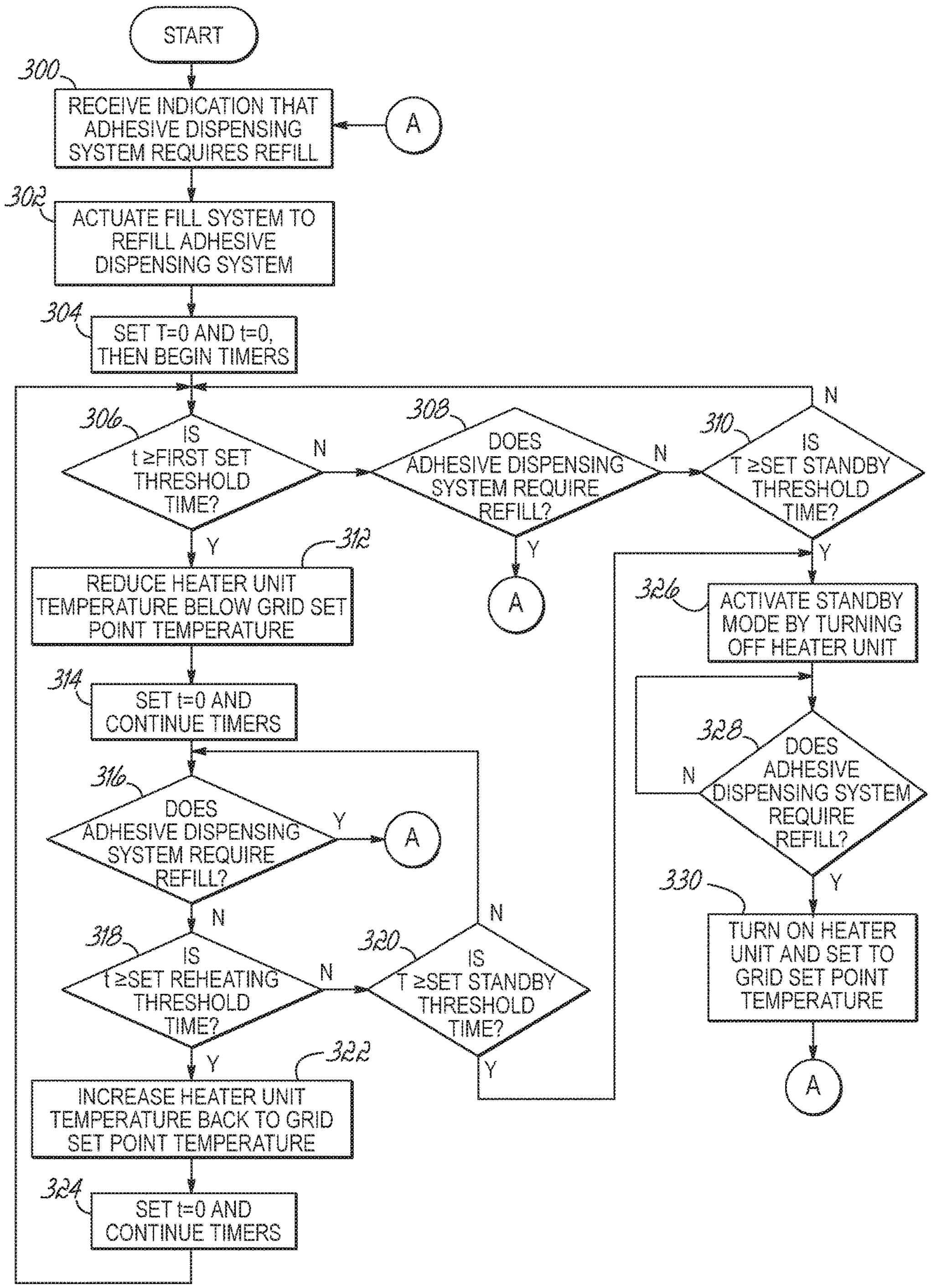
FIG. 9 is a flowchart illustrating a series of operations performed by a controller of the adhesive dispensing system of FIG. 1, according to yet another embodiment of the method used with the adhesive dispensing system.

With reference to FIG. 9, another embodiment of a method used with the adhesive dispensing system 10 is shown as a series of operations. This series of operations is similar in many ways to the others described above in FIGS. 3 and 6, but differs in multiple ways described below. The series of operations enables both a smart melt mode and a standby mode to be used without the necessity for signals to be delivered back from the dispenser gun 24 to the controller 28.

The series of operations in FIG. 9 begins with the controller 28 receiving an indication that the adhesive dispensing system 10 requires a refill (block 300). This indication could be prompted by the level sensor 16 in the hopper 12 as described above. Once this refill indication is received, the controller 28 actuates the fill system 26 to supply the adhesive dispensing system 10 with additional adhesive (block 302). The controller 28 then sets two time variables T (indicating total time) and t (indicating current cycle time) to zero and begins the timer 30 (block 304). The controller 28 determines if the current cycle time t is greater than the first set threshold time (block 306). If the current cycle time t has not yet exceeded the first set threshold time, then the controller 28 determines if the adhesive dispensing system 10 requires a refill of adhesive (block 308). If such a refill of adhesive is required, the controller 28 returns to block 300 to begin the process by refilling the adhesive dispensing system 10 again. If the adhesive dispensing system 10 does not require a supply of adhesive, then the controller 28 determines if the total time T exceeds a set standby threshold time (block 310). If the total time T does exceed the set standby threshold time, then a standby mode is activated as described in further detail below. If the total time T does not exceed the set standby threshold time, then the controller 28 returns to block 306 and repeats this set of three inquiries (blocks 306, 308, 310) until either the current cycle time t exceeds the first set threshold time, the adhesive dispensing system 10 requires a refill, or the total time T exceeds the set standby threshold time.

Now assume that the controller 28 determines at block 306 that the current cycle time t does exceed the first set threshold time. In such a circumstance, the controller 28 activates the smart melt mode by continuing to operate the heater unit 18 while reducing the heater unit temperature below the grid set point temperature (block 312). The controller 28 then resets the current cycle time t to zero and continues operation of the timer 30 (block 314). Note that the total time T continues to run from the beginning of the series of operations for purposes set forth in greater detail below. The controller 28 then performs three inquiries similar to those described above for blocks 306, 308, and 310. To this end, the controller 28 determines if the adhesive dispensing system 10 requires a refill of adhesive (block 316). If such a refill of adhesive is required, the controller 28 returns to block 300 to begin the process by refilling the adhesive dispensing system 10 again. If the adhesive dispensing system 10 does not require a supply of adhesive, then the controller 28 determines if the current cycle time t is greater than the set reheating threshold time (block 318). If the current cycle time t has not yet exceeded the set reheating threshold time, then the controller 28 determines if the total time T exceeds a set standby threshold time (block 320). If the total time T does exceed the set standby threshold time, then a standby mode is activated as described in further detail below. If the total time T does not exceed the set standby threshold time, then the controller 28 returns to block 316 and repeats this set of three inquiries (blocks 316, 318, 320) until either the current cycle time t exceeds the set reheating threshold time, the adhesive dispensing system 10 requires a refill, or the total time T exceeds the set standby threshold time.

Now assume that the controller 28 determines at block 318 that the current cycle time t does exceed the set reheating threshold time. In such a circumstance, the controller 28 temporarily deactivates the smart melt mode by continuing to operate the heater unit 18 while increasing the heater unit temperature back to the grid set point temperature (block 322). The controller 28 then resets the current cycle time t to zero and continues operation of the timer 30 (block 324). Note that the total time T continues to run from the beginning of the series of operations for purposes set forth in greater detail below. The controller 28 then returns to block 306 and repeats the three inquiries described above for blocks 306, 308, and 310. Therefore, the controller 28 operates to repeatedly activate and deactivate a smart melt mode over a long period of time between refill actuations so that the adhesive in the adhesive dispensing system 10 is cooled, but not to an extent where the warm up time would be excessive when dispensing operations at a high throughput begin again.

If the controller 28 ever determines that the total time T exceeds the set standby threshold time at blocks 310 or 320, then the controller 28 activates a standby mode by turning off the heater unit 18 (block 326). If necessary, other heating elements at the reservoir 42 or other locations may also be turned off during this standby mode. The standby mode significantly drops the temperature of the adhesive after a long period of time between refilling cycles so that heating energy is not wasted when the adhesive dispensing system 10 is in long periods of non-use. Consequently, the set standby threshold time is typically much longer than the first set threshold time and the set reheating threshold time so that the standby mode is only activated when it is clear that the adhesive dispensing system 10 is in a long period of inactivity. Of course, the standby mode may also be programmed to be actuated from an operator input at a manual control button as well in other embodiments. While in the standby mode, the controller 28 repeatedly determines if the adhesive dispensing system requires a refill (block 328). Once such a refill is necessary, then the controller 28 returns to block 300 to begin the process again after turning the heater unit 18 and any other turned-off heating equipment back on (block 330). A more extended warm-up time will likely be necessary when coming out of the standby mode, but this is acceptable because the standby mode is not activated unless dispensing activities have truly stopped in the adhesive dispensing system 10. As a result of combining the smart melt mode and the standby mode, energy and time efficiency are maximized in all operating states of the adhesive dispensing system 10.

Figure 10:
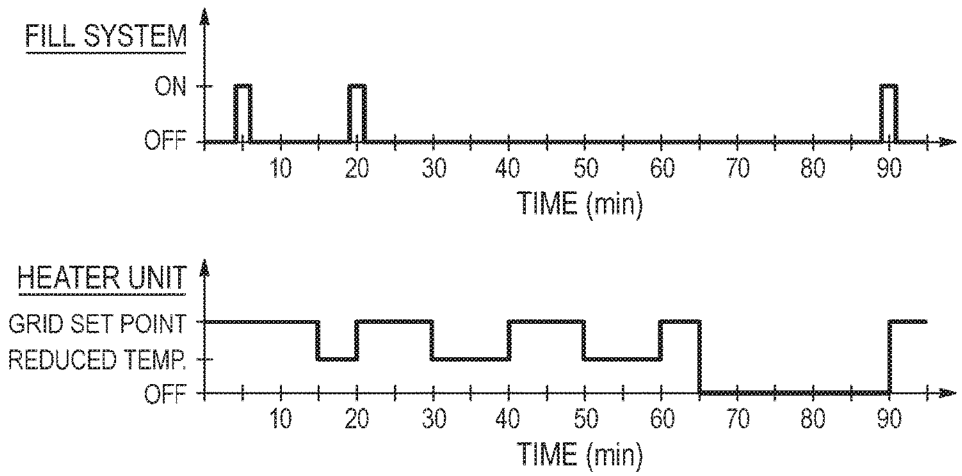
FIG. 10 is a time graph showing the operational states of a fill system and a heater unit of the adhesive dispensing system of FIG. 1 operating the series of operations of FIG. 9.

The beneficial operation of the adhesive dispensing system 10 during the series of operations shown in FIG. 9 is shown in graphical form in FIG. 10. To this end, FIG. 10 illustrates a schematic representation of ON/OFF signals for the fill system 26 and temperature set point levels for the heater unit 18 during a period of very low throughput. For the purposes of this example, assume that the first set threshold time is set to 10 minutes, the set reheating threshold time is also set to 10 minutes, and the set standby threshold time is set to 45 minutes (which is unrealistically low in most circumstances, but allows for illustration of the standby mode in this graph). The adhesive dispensing system 10 is operated so that refill operations by the fill system 26 occur at time t=5 minutes, 20 minutes, and 90 minutes. As can be seen in the gap between the first two actuations of the fill system 26, the gap of time is 15 minutes which is longer than the first set threshold time. As a result, the smart melt mode is activated from time t=15 minutes to time t=20 minutes, thereby reducing the adhesive temperature and limiting any degradation of the adhesive over this period of time. Similarly, the gap of time between the second and third actuations of the fill system 26 is also long enough to cause the smart melt mode to be activated.

In addition, this latter gap of time is 70 minutes, which enables the first set threshold time of 10 minutes and the set reheating threshold time of 10 minutes to repeatedly occur. That leads to the smart melt mode being cycled on and off every 10 minutes beginning at time t=30 minutes. Once the total time from the last refill is larger than the set standby threshold time (at time t=65 minutes), the standby mode is activated and the heater unit 18 is turned completely off as shown. This standby state remains until the next refill occurs, thereby stopping the repeated cycling of the heater unit 18 between the grid set point temperature and the reduced temperature below the set point. Consequently, the degradation of the adhesive in the adhesive dispensing system 10 is reduced, and the adhesive dispensing system 10 is effectively shut down during long periods of (presumed) inactivity. The energy savings and adhesive life improvements over a conventional system that holds the adhesive at the same elevated set point for all 90 minutes during this example are significant and advantageous.

While the present invention has been illustrated by a description of several embodiments, and while those embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive dispensing system, comprising:
- a heater unit configured to heat an adhesive to an application temperature;
- a fill system configured to supply the adhesive to said heater unit; and
- a controller configured to:
  - actuate said fill system to supply the adhesive to said heater unit,
  - operate said heater unit to maintain a unit set point temperature sufficient to heat the adhesive to the application temperature, and
  - operate said heater unit to reduce its temperature from the unit set point temperature following a first set threshold time from actuation of said fill system to supply the adhesive to said heater unit.

2. The adhesive dispensing system of claim 1, wherein said controller is further configured to:
- actuate said fill system to resupply the adhesive to said heater unit, and
- operate said heater unit to increase the temperature of said heater unit back to the unit set point temperature sufficient to heat the adhesive to the application temperature.

3. The adhesive dispensing system of claim 2, wherein said controller is further configured to operate said heater unit to reduce its temperature from the unit set point temperature following the first set threshold time from actuation of said fill system to resupply the adhesive to said heater unit.

4. The adhesive dispensing system of claim 1, wherein said controller is further configured to operate said heater unit to reduce its temperature again following another first set threshold time following the first set threshold time from actuation of said fill system to supply the adhesive to said heater unit.

5. The adhesive dispensing system of claim 1, further comprising:
- a reservoir positioned to receive melted adhesive; and
- a heater configured to apply heat to the reservoir to a reservoir set point temperature that maintains the adhesive at the application temperature within said reservoir.

6. The adhesive dispensing system of claim 5, wherein said controller is further configured to operate said heater to maintain the reservoir set point temperature after operating said heater unit to reduce its temperature.

7. The adhesive dispensing system of claim 6, wherein said controller is further configured to operate said heater to reduce the reservoir set point temperature following a second set threshold time from actuation of said fill system to supply the adhesive to said heater unit, the second set threshold time being greater than the first set threshold time.

8. The adhesive dispensing system of claim 1, further comprising a timer in electrical communication with the controller, the timer being configured to track an elapsed time from actuation of said fill system to supply the adhesive to said heater unit.

9. The adhesive dispensing system of claim 1, further comprising a level sensor configured to detect a level of adhesive remaining within said heater unit.

10. The adhesive dispensing system of claim 9, wherein said controller is further configured to actuate said fill system to supply the adhesive to said heater unit in response to said level sensor detecting that the level of adhesive within said heater unit is below a threshold.

11. The adhesive dispensing system of claim 9, wherein said level sensor is further configured to:

provide a first indication to said controller when the level of adhesive within said heater unit is below a first level indicating a supply of adhesive will be needed at a future time from said fill system, and provide a second indication to said controller when the level of adhesive within said heater unit is below a second level requiring immediate supply from said fill system.

12. The adhesive dispensing system of claim 11, wherein said controller is further configured to operate said heater unit to increase its temperature back to the unit set point temperature when the first indication is received from said level sensor.

13. The adhesive dispensing system of claim 1, wherein said controller is further configured to turn said heater unit off following a standby threshold time from actuation of said fill system to supply the adhesive to said heater unit, the standby threshold time being greater than the first set threshold time.

14. The adhesive dispensing system of claim 1, wherein said controller is further configured to operate said heater unit to increase its temperature back to the unit set point temperature after reducing the temperature of the heater unit to below the unit set point temperature.

15. The adhesive dispensing system of claim 14, wherein said controller is further configured to operate said heater unit to increase its temperature back to the unit set point temperature following a set reheating threshold time after reducing the temperature of the heater unit to below the unit set point temperature.

16. The adhesive dispensing system of claim 15, wherein said controller is further configured to:

determine an average cycle time between refill actuations of the fill system, and adjust the first set threshold time and the set reheating threshold time based on the average cycle time.

17. The adhesive dispensing system of claim 16, wherein said controller is further configured to adjust the first set threshold time and the set reheating threshold time based on the average cycle time by:

estimating, based on the average cycle time, a predicted time for when the fill system will be actuated to supply adhesive; and setting the set reheating threshold time to be lower than the predicted time.

18. The adhesive dispensing system of claim 1, further comprising:

a pump configured to deliver the heated adhesive from the heater unit to a dispensing module; and the dispensing module to apply the heated adhesive to a substrate.

19. The adhesive dispensing system of claim 1, further comprising a hopper configured to receive solid adhesive from the fill system and to provide the solid adhesive to the heater unit.

20. The adhesive dispensing system of claim 19, further comprising a level sensor within the hopper for detecting a level of solid adhesive.

21. The adhesive dispensing system of claim 1, wherein the heater unit comprises a grid to heat the adhesive to the application temperature.

22. The adhesive dispensing system of claim 1, further comprising a temperature sensor positioned to sense the temperature of the heater unit, the temperature sensor being in electrical communication with the controller.

23. The adhesive dispensing system of claim 1, wherein the first set threshold time is received from a user of the adhesive dispensing system.

* * * * *